[DESIGN.]
---
E. MINGAY.
Heating-Stoves.
No. 5,712. Reissued Dec. 30, 1873.
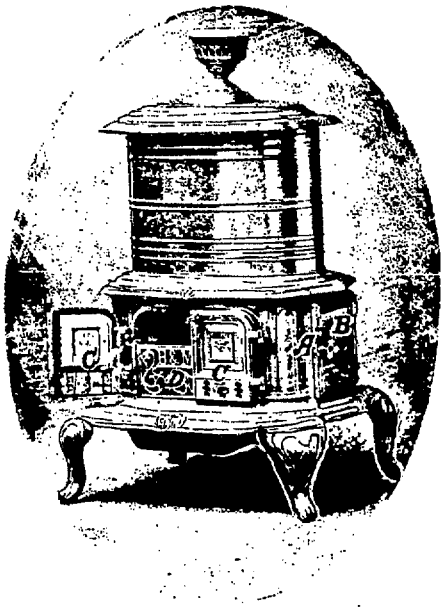
Witnesses.
W. Geo. Neden
H. E. Boardman.
Edward Mingay.
by F. Curtis.
Atty.

UNITED STATES PATENT OFFICE.

EDWARD MINGAY, OF BOSTON, MASSACHUSETTS.

DESIGN FOR A HEATING-STOVE.

Specification forming part of Design No. 5,930, dated June 11, 1872; reissue No. 5,712, dated December 30, 1873; application filed August 20, 1873.

*To all whom it may concern:*

Be it known that I, EDWARD MINGAY, of Boston, Massachusetts, have invented Designs for Air-Tight Heating-Stoves, of which the following is a specification:

My designs are represented in the accompanying photograph, to which reference is made.

A represents an oblong cast-iron box or base, with round corners, having a door, B, at one end, for insertion of fuel, and double doors C C in front, the doorway in front having an ornamental guard or fender, to prevent the escape of coals or fuel when the doors C C are opened to expose the fire to view. Surmounting the base A is an elliptical sheet-iron cylinder, having raised beads encircling it, and surmounted by a cast-iron top and urn.

The new designs contained in this stove, as shown in the photograph, consist in the configuration and ornamentation of its parts, respectively, and several of them in combination with the sheet-iron cylinder; and the novel configuration and ornamentation are as follows:

The top and bottom of the base or box A and the top of the stove are castings conforming in general contour to that of the base or box A, the two former projecting out beyond its perpendicular walls, and the latter projecting out beyond the sheet-iron cylinder. The lower half of the periphery of each of these castings bears a convex molding between two flat faces, which respectively extend outward from the base of this molding, and at the center of each end and of the front a raised panel surmounting this molding bears a line of beads transverse to the molding, and the upper of said flat faces is brought down on each side of this panel in a curved line to the edge of the periphery of the casting, and the lower of said flat faces is brought up in a helical line by the side of the last-named curved line, and terminates in a knob. These castings are rounded at their corners by four ogee curves on each side of the corner.

The bottom of the base has an orifice for the hearth-plate, and the upper half of its periphery bears two concave moldings, between which is a convex molding, which moldings project into an angular shoulder at each side of the said orifice. The base A has an opening in front corresponding to the outline of the doors, its lower corners being angular, and its upper corners being arched, and above each upper corner of this opening is a pyramidal ornament in relief.

The corners of the box or base A have each a convex molding between two flutes between the said opening and a panel, and a convex molding and a flute on the other side of the panel, all projecting near their lower ends into two convex moldings, with a concave molding between them, running laterally.

The panel bears a peculiar ornament in relief. At one end the base A is prolonged into a rectangular casing or frame for the reception of the door. The top of the box or base has on the upper half of its periphery two concave moldings, with a convex molding between them, and is fitted to receive the sheet-iron cylinder. The top of the stove has on the upper half of its periphery a convex molding between two flat faces, which extend outward from its base. Its upper surface, which may or may not be ornamented, as shown in the photograph, at its center, rises into the section of a truncated cone, which bears on its periphery a convex molding, and above this, two grooves.

The base of the urn is a truncated cone, on the periphery of which is a concave molding, next above a wreath of crosses, on diamond-shaped panels, between which are perforations; next above it, two convex moldings, and above them a concave molding. The stem and bowl of the urn are oblong and curvilinear, and on their periphery, beginning at the base, they bear, alternately, two concave and two convex moldings, and above them are two rows of oblong perforations, each surrounded by a raised rim, between which apertures, at the adjoining ends of the two rows, are crosses in relief, and, at the opposite ends, sections of these crosses. The urn has an overhanging rim or lip, ornamented with a wreath of crosses, alternating with beads, all in relief.

Each of the doors B C C has on its lower half an oblong rectangular panel, surrounded by a raised rim, having perpendicular apertures, with scalloped sides, each surrounded by a raised rim, which may be closed by a slide, the middle opening being fitted for the reception of a sliding knob attached to the slide. Above this panel is another panel, rectangular in the end door B, but rounded at the upper outer corner in each of the front doors C C. This panel is surrounded by a convex and a concave molding, inside of the latter of which is a rectangular band of beads, surrounding a rectangular line of larger beads, inside of which is a panel surrounded by a raised rim. The fender D is a rectangular frame, within which is an ornamental openwork of peculiar design, as shown in the photograph.

The letters and monograms shown in the photograph on the doors B C C and fender D do not form a part of these designs.

I claim—

1. The design of the urn, as shown and described.

2. The design of the cast-iron top, formed and ornamented as shown and described.

3. The design of the cast-iron base, formed and ornamented as shown and described.

4. The design of the doors B and C C, formed and ornamented as shown and described.

5. The design of the top, base, cylinder, doors B and C C, and fender D, formed and ornamented as hereinbefore shown and described, in combination, as shown and described.

EDWARD MINGAY.

Witnesses:
ARTHUR E. JONES,
THEO. A. DODGE.